UNITED STATES PATENT OFFICE.

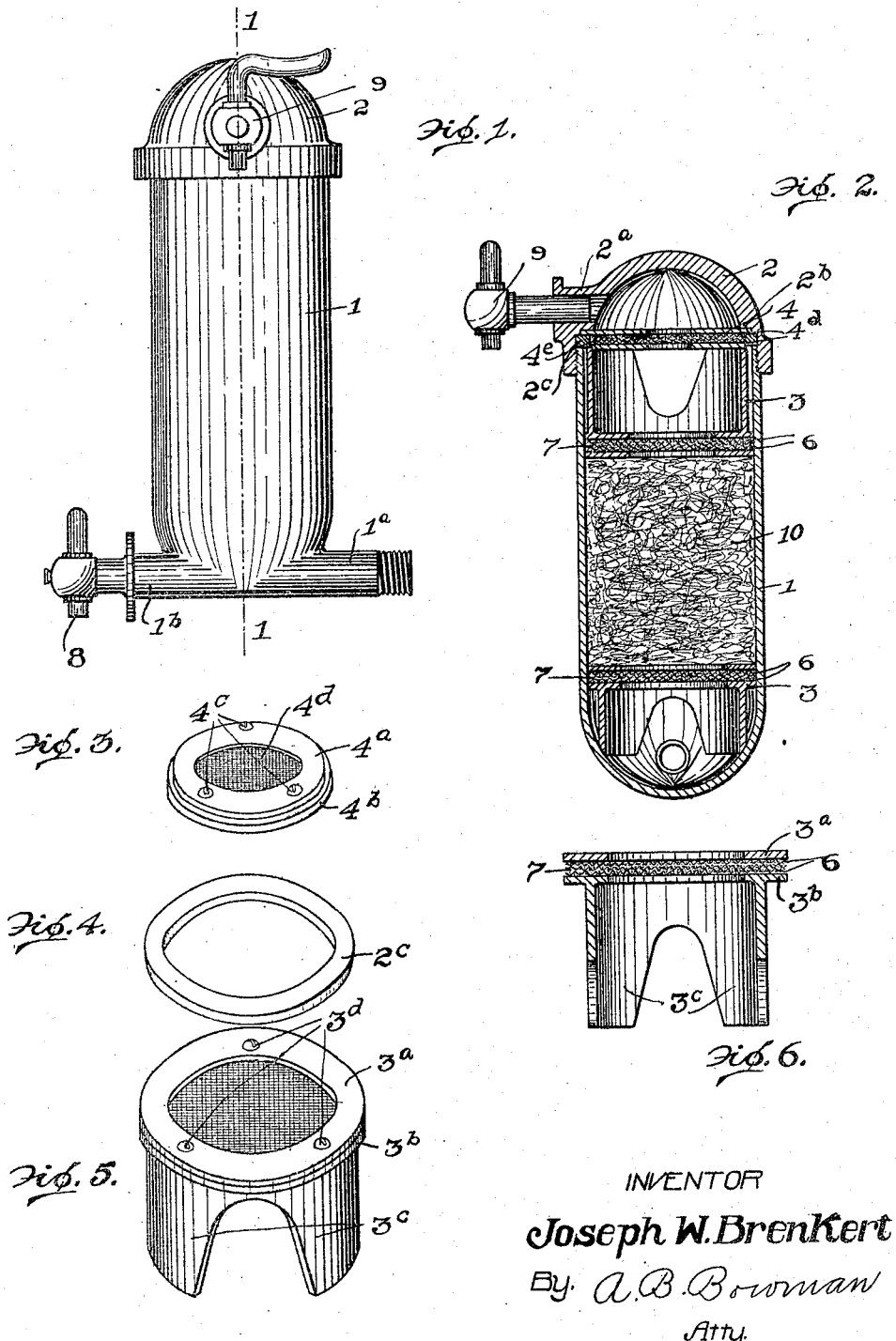

JOSEPH W. BRENKERT, OF SAN DIEGO, CALIFORNIA.

WATER-FILTER.

1,223,028.   Specification of Letters Patent.   Patented Apr. 17, 1917.

Application filed October 31, 1916.   Serial No. 128,675.

*To all whom it may concern:*

Be it known that I, JOSEPH W. BRENKERT, a citizen of the United States, residing at San Diego, in the county of San Diego and State of California, have invented certain new and useful Improvements in Water-Filters, of which the following is a specification.

My invention relates to a water filter to be used in connection with the regular water supply for filtering water for use, and the objects of my invention are: first, to improve the general form and construction of water filter for which I applied for a patent in the United States Patent Office on June 17, 1916, Serial Number 104,160, making it more efficient; second, to provide a filter of this class which will clean itself by the proper manipulation of some of the parts; third, to provide a means in connection therewith for providing additional resistance to the water in its passage through the filter so as to give the cotton time to absorb the animal and vegetable slime in the water; and fourth, to provide a filter of this class which is simple and economical of construction, durable, easy to operate and will not readily deteriorate or get out of order.

With these and other objects in view, as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification in which:

Figure 1 is a side elevational view of my filter complete. Fig. 2 is a sectional view through 1—1 of Fig. 1. Fig. 3 is a perspective view of the upper resistance screen and supports. Fig. 4 is a perspective view of the gasket for holding the upper screen support in position and forming a tight joint between the cap and upper end of the casing. Fig. 5 is a perspective view of one of the plunger members and Fig. 6 is a sectional view thereof.

Similar characters of reference refer to similar parts throughout the several views.

The casing 1, cap 2, plunger members 3, resistance screen support 4, screens 6, cloth 7, faucet 8, faucet 9 and cotton 10 constitute the principal parts of my filter.

The casing 1 is cup shaped and it is provided at its lower end with extensions $1^a$ and $1^b$ which are provided with inlet and outlet openings communicating with the inner surface of said casing for providing inlet and outlet openings thereto. Mounted in the outlet opening is a faucet 8. Mounted on the open end of said casing is the cap 2 which is provided with an outlet aperture $2^a$ into which is secured the faucet 9. Mounted in this cap 2 is the resistance screen support 4 which is shaped as shown best in Fig. 3 of the drawings, consisting of a ring $4^a$ and another similar ring $4^b$. Mounted between these rings $4^a$ and $4^b$ are a pair of different mesh screens $4^d$ and between these screens is placed a piece of fine cloth $4^e$ and the whole secured together by means of the screws $4^c$. The outer edge of the ring $4^a$ fits into an annular recess in the cap and against the outer edge of this ring and against the shoulder $2^b$ the gasket $2^c$ rests, its inner edge engaging with the outer edge of the ring $4^b$ so that the gasket $2^c$ serves as a retainer for holding the screen supports in position and also for forming a tight joint between the casing 1 and the cap 2. It will be here noted that the central holes in the rings $4^a$ and $4^b$ are small so as to retard the flow of water giving the cotton a chance to absorb the slime from the water in its course through said cotton. Mounted in each end of the casing are the plungers 3 which consist of a ring $3^a$, another ring $3^b$ which is provided with a plurality of lugs $3^c$ adapted to prevent the plungers from tilting in the casing and to provide a space on the outer sides of said plungers. Mounted between the rings $3^a$ and $3^b$ are a pair of different mesh screens 6 and mounted between the screens is a piece of fine cloth 7 and the two rings $3^a$ and $3^b$ are secured together by means of the screws $3^d$. Mounted between the two plungers in the casing 1 is a mass of cotton preferably cotton waste. The extension $1^a$ is adapted to connect with the regular service pipe as it is threaded externally with a regular pipe thread for that purpose. If it is desired to filter the water the faucet 8 is closed and the faucet 9 opened and the water passes through the screens and cloth in the lower plunger through the cotton waste 10, through the screens and cloth in the upper plunger then through the screens and cloth over the smaller hole in the resistance screen support and out through the faucet 9 for use. It will be here noted that the pressure from the water service pipe packs the cotton 10, therefore the more the pressure the more compact the cotton becomes and the more efficient the filter. The small holes through the rings 4ª and 4ᵇ with the screens and cloth covering the same form a resistance for holding the water back and give the cotton time to absorb the animal and vegetable slime in its passage through the cotton and also serves as an additional means of filtering the water just before its passage for use. In cases where it is not desirable to filter the water the faucet 9 is closed and the faucet 8 opened and the water passes through the lower end of the filter carrying with it the coarse dirt which will not pass through the first screens and cloth when filtering thus cleaning the coarse dirt from the filter, also the slime and finer dirt carried upward into the cotton and other screens may be cleaned from the filter by opening the faucet 8 wide open and opening the faucet 9 slightly and allowing the water to pass out of the faucet 8 will cause a backward pressure which will cleanse the filter of dirt and slime.

Though I have shown and described a particular construction, combination and arrangement of parts, I do not wish to be limited to this particular construction, combination and arrangement, but desire to include in the purview of my invention the construction, combination and arrangement substantially as set forth in the appended claims.

Having thus described my invention, what I claim as new and desire to secure by Letters Patent is:

1. In a filter of the class described, the combination of a casing provided with an inlet port and an outlet port at its lower end, a plunger in each end each provided with screens and a cloth placed between said screens, cotton placed between said plungers, a cap secured on the upper end of said casing, an outlet faucet communicating with the inner surface of said cap, and a resistance means between the upper plunger and said cap comprising two ring supports with small sized apertures therein and screens secured between said ring supports.

2. In a filter of the class described, the combination of a casing provided with an inlet and outlet port at its lower end, another outlet port at its upper end, a pair of plungers reciprocally mounted therein each carrying screens with a cloth placed between the same, a mass of cotton placed between said plungers in said casing, and a resistance member secured in the upper end of said casing comprising rings with small perforations therein, screens secured between said rings and a cloth secured between said screens.

In testimony whereof, I have hereunto set my hand at San Diego, California this 25th day of October, 1916.

JOSEPH W. BRENKERT.

Copies of this patent may be obtained for five cents each, by addressing the "Commissioner of Patents, Washington, D. C."